Nov. 23, 1948.  D. P. SHOEMAKER  2,454,574
FLOW REGULATOR
Filed March 26, 1946
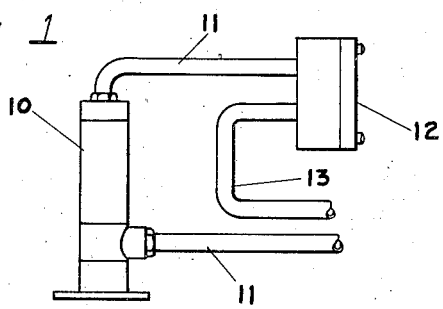
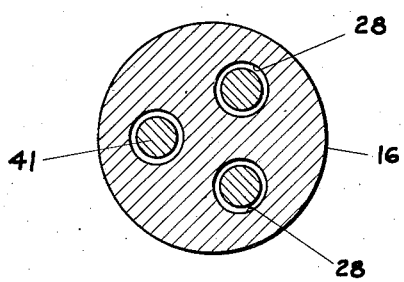
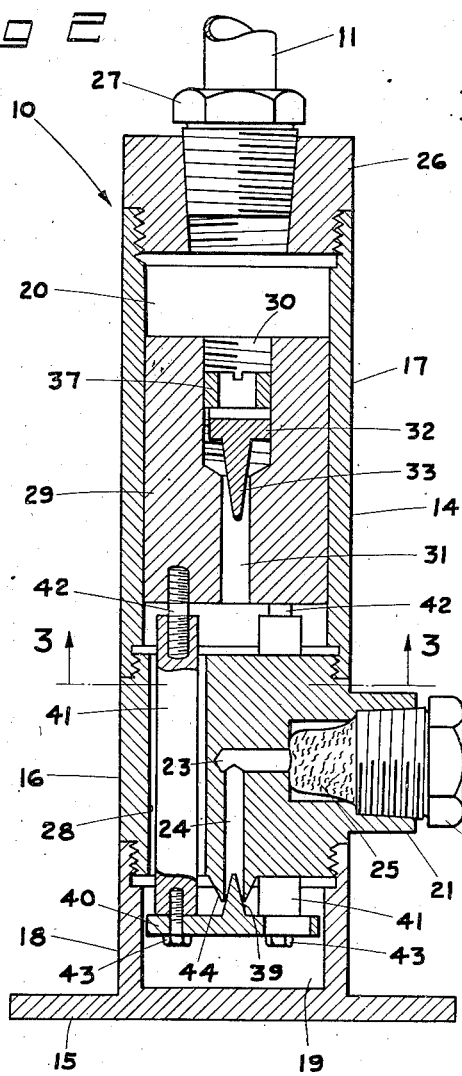
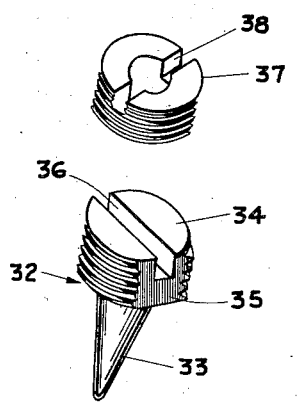
INVENTOR.
DAVID P. SHOEMAKER
BY
M. A. Hayes
ATTORNEY Patented Nov. 23, 1948

2,454,574

UNITED STATES PATENT OFFICE 2,454,574

FLOW REGULATOR

David P. Shoemaker, Pasadena, Calif., assignor to the United States of America as represented by the Secretary of the Navy Application March 26, 1946, Serial No. 657,179

1 Claim. (Cl. 137—152.5)

This invention relates to flow regulators and more particularly to regulators for fluid meters.

An object of the invention is to provide improved regulating means for maintaining a uniform discharge pressure or constant flow irrespective of fluctuations of the inlet pressure.

Other objects of the invention are to provide an improved flow regulator of such construction as to be adaptable for use in introducing fluid to a meter requiring a uniform pressure or constant flow and capable of controlling the pressure or flow upon variation thereof; to provide an improved flow regulator of compact construction adaptable for installation in portable apparatus; to provide an improved flow regulator of such construction as to eliminate the necessity of frequent readjustment; and to provide improved elements and arrangements thereof in a flow regulator of the character described and for the purposes set forth.

In accomplishing these and other objects of the present invention, I have provided improved details of structure, the preferred form of which is illustrated in the accompanying drawing, wherein:

Fig. 1 is a schematic plan view, showing a flow regulator embodying the features of the present invention connected in the inlet line of a fluid meter.

Fig. 2 is a longitudinal, sectional view of the regulator.

Fig. 3 is a transverse, sectional view, taken on the line 3—3 of Fig. 2.

Fig. 4 is a perspective view of the needle valve and its lock nut.

Referring more in detail to the drawing:

In Fig. 1, the numeral 10 designates a flow regulator connected in a pipe or line 11 which conducts fluid, such as oxygen or other gas, to a suitable meter 12. A discharge pipe or line 13 leads from the meter 12 for delivering a metered flow of gas to a point of use or other disposition (not shown). The construction of the meter is of such nature as to render the same sensitive to fluctuations of the pressure or flow of the fluid delivered thereto and the regulator 10 is adapted ot maintain such uniformity of flow.

As is most clearly shown in Fig. 2, the regulator includes a substantially upright, cylindrical housing or body 14 having an enlarged base 15 at its lower end. In order to simplify assembly of the regulator, the body preferably includes a plurality of separate elements, such as the base 15, a cylindrical block or member 16 and a cylindrical shell or sleeve 17. An upstanding, annular flange or collar 18 is made integral with the base 15 and is preferably screw-threaded upon the lower end of the member 16 so as to provide a chamber 19 therebelow. The sleeve 17 has its lower end screw-threaded upon the upper end of the member to form a cylinder 20 above said member.

For establishing communication between the chamber 19 and the upstream portion of the line 11, an annular boss 21 is formed on the exterior of the member 16 and has said line 11 connected therein by means of a suitable fitting 22. A radial port 23 extends inwardly from the boss 21 and registers with an axial port 24 which extends downwardly through the member to the chamber 19. In order to filter the fluid flowing into the regulator, it is preferable to interpose a wad 25, of felt, or other suitable material, in the boss 21 between the fitting 22 and the radial port 23.

An annular cap or plug 26 is screw-threaded in the upper end of the cylinder 20 for receiving a suitable fitting 27 which is connected to the downstream portion of the inlet line 11, whereby said cylinder communicates with the latter. Communication between the cylinder and the chamber 19 is established by a plurality of vertical ports or openings 28, preferably three in number, which extend through the member 16 in surrounding relation to the axial port 24. The boss 21 provides an inlet for the regulator, and fluid flowing therethrough is conducted to the chamber by the ports 23 and 24 and from said chamber through the openings 28 to the cylinder 20, from which the fluid escapes through the bore of the cap 26 which provides an outlet for said regulator.

A cylindrical plunger or piston 29, having an axial, screw-threaded bore 30, is slidably mounted within the cylinder 20 so as to be exposed to the fluid admitted to said cylinder and thereby be responsive to the pressure of said fluid. The lower portion of the bore 30 is of reduced diameter to provide a counterbore 31. A needle valve 32, having a depending, tapered shank or pin 33 and an enlarged, externally screw-threaded head 34 (Fig. 4) is mounted within the bore 30 with its pin extending into the counterbore 31. In order to permit flow past the needle valve 32, its head 34 preferably has a portion of its exterior cut away as shown by the numeral 35 and a transverse or diametric groove 36 is formed in its upper end. The groove 36 also permits manual adjustment of the needle valve.

An annular, externally screw-threaded lock nut 37 engages within the bore 30 so as to overlie and maintain the needle valve in adjusted positions. Adjustment of the nut 37 is permitted by means of a transverse diametric groove 38 formed in its upper end (Fig. 4). By observing Fig. 2 it will be seen that flow through the piston is upwardly through the counterbore 31 past the tapered pin 33 of the needle valve 32, through the cut away portion 35 of the valve head 34, then laterally into the groove 36 of said head, and then upwardly through the bore of the nut 37 and the piston bore 30.

For controlling the flow from the inlet through the ports 23 and 24, a needle valve element 39 is adapted to engage within the lower end of said port 24 and is preferably supported by a suitable spider 40 which is disposed within the chamber 19. The spider 40 is preferably suspended from the piston 29 by means of short rods or pins 41 which extend through the openings 28 of the member 16 (Fig. 3) and which are fastened to said piston by stud bolts 42 and to said spider by suitable screws 43. For coacting with the valve element 39, an annular boss 44 depends from the member 16 in surrounding relation to the lower end of its axial port 24.

Operation

The operation of a flow regulator constructed as described is as follows:

The flow through the regulator 10 is determined by the adjustment of the needle valve 32 and the pressure differential across the piston 29. If this pressure differential, which is controlled by the flow from the inlet past the needle valve element 39 into the chamber 19, varies from the pressure differential defined by the weight and area of said piston, the latter moves within the cylinder 20 so as to raise or lower said needle valve element, thereby decreasing or increasing the flow into said chamber. Manifestly, in operation, the piston tends to assume a position of equilibrium at which a substantially constant or predetermined pressure differential across said piston is obtained, whereupon the flow from the outlet of the regulator to the meter 12 may be determined by the adjustment or setting of the needle valve 32. In other words, for any given inlet pressure, there is a corresponding equilibrium position of the piston. This position is such that the throttling action of the needle valve element 39 is sufficient to maintain the pressure differential across the piston at a value which is substantially constant and predetermined by the area and weight of said piston, whereby constant fluid flow to the meter is maintained.

While I have shown but one embodiment of my invention, it is susceptible to modification without departing from the spirit of the invention. I do not wish, therefore, to be limited by the disclosures set forth, but only by the scope of the appended claim.

The invention described herein may be manufactured and used by or for the Government of the United States of America for governmental purposes without the payment of any royalties thereon or therefor.

I claim:

A flow regulator adapted to be connected in a fluid line including, a body, a chamber in the lower portion of the body, said body having a port adapted to establish communication between the chamber and the inlet end of a fluid line, a needle valve in the port for controlling flow therethrough, a cylinder in the upper portion of said body and adapted to establish communication between a passage in communication with said chamber and the outlet end of a fluid line, a piston slidably mounted in the cylinder and responsive to the flow thereinto, the piston having a bore permitting flow therethrough, an adjustable needle valve in the bore for controlling flow therethrough, means adjustably mounted in said bore for maintaining the adjustable needle valve in fixed positions, and adjustable means connecting said piston to the port needle valve whereby the adjustment of the latter is controlled by the position of said piston as varied by the position of said adjustable needle valve.

DAVID P. SHOEMAKER.

REFERENCES CITED

The following references are of record in the file of this patent:

UNITED STATES PATENTS

| Number | Name | Date |
|---|---|---|
| 586,089 | Hall | July 9, 1897 |
| 2,367,662 | Baxter | Jan. 23, 1945 |